United States Patent Office 3,753,917
Patented Aug. 21, 1973

3,753,917
CURING AGENT FOR EPOXY RESINS TO IMPART EXCELLENT SOLVENT RESISTANCE
Johannes Spoelder, Au, Switzerland, and Max Schonbachler, Johannesburg, Transvaal, Republic of South Africa, assignors to The Dow Chemical Company, Midland, Mich.
No Drawing. Filed May 26, 1971, Ser. No. 147,245
Int. Cl. C08g 51/84
U.S. Cl. 252—182                    1 Claim

ABSTRACT OF THE DISCLOSURE

As a curing agent for epoxy resin, a blend of an aromatic diamine and an aralkanol, such as benzyl alcohol, with viscosity increased and cross-linking of finished product enhanced by an epoxy novolac, accelerated by an aromatic acid such as salicylic acid. When mixed with a liquid polyepoxide, the curing agent gives prompt cure to a finished product having excellent solvent resistance.

BACKGROUND OF THE INVENTION

Field of the invention

In the curing of polyepoxides to obtain epoxy resins, the choice of curing agent is important to the properties of the finished product. This invention teaches a curing agent which leads to epoxy resins having very high resistance to solvent and chemical attack. It has been especially useful in a chemical plant floor where it is exposed to almost daily washing with acetone and dichloromethane.

The prior art

All the substances of which the present curing composition is composed are known in the epoxy resin art. Each of them appears, for example, in the book "Handbook of Epoxy Resins" (McGraw-Hill, New York) 1967 by Lee and Neville. The instant invention lies in the combination of the ingredients within the range of quantities indicated.

DESCRIPTION OF THE PRESENT INVENTION

This invention relates to a curing agent for epoxy resins and more particularly relates to a curing agent which cures epoxy resins to provide products having very high resistance to solvent and chemical attack.

The curing agent of this invention comprises an aromatic diamine, an aralkanol, an epoxy novolac and an aromatic acid.

Methylene dianiline is the preferred aromatic diamine but other diamines such as, for example, metaphenylene diamine, and xylylene diamine may be employed if desired.

The aralkanols to be employed in the curing agent of this invention are those having the formula

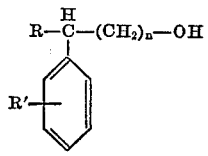

in which $n$ is 0 to 3, R is hydrogen or an alkyl group having 1 to 3 carbon atoms and R' is hydrogen, an alkyl group having from 1 to 6 carbon atoms, halogen or an alkoxy group having from 1 to 5 carbon atoms.

Useful alcohols include, for example, parabromobenzyl alcohol, β-phenethyl alcohol, 2-phenylbutanol, mixed isomeric methoxybenzyl alcohols and mixed isomeric o- and p-chlorobenzyl alcohol.

Benzyl alcohol is the preferred alcohol.
Aromatic acids which may be used include those having the formula

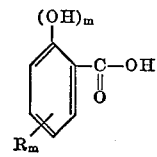

wherein R represents an alkyl group of from 1 to 6 carbon atoms, halogen or alkoxy of from 1 to 5 carbon atoms and $m$ is 0 or 1. The preferred acid to use is salicylic acid although other aromatic acids such as, for example, benzoic acid, paratertiary butyl salicylic acid, the isomeric chlorosalicylic acids and the lower alkyl benzoic acids may be employed with advantage.

Any epoxy novolac may be employed in the curing agent of this invention. Advantageously the epoxy novolac will have an epoxide equivalent weight of from 172 to 210 or higher. The preferred epoxy novolacs have an epoxide equivalent weight of from 175 to 182.

The components of curing agent of this invention are generally employed in proportions of from 45 to 55 parts by weight of methylene dianiline or its equivalent, 5 to 15 parts by weight of an epoxy novolac having an epoxide equivalent weight of 175–182 or its equivalent, from 25 to 48 parts by weight of benzyl alcohol or its equivalent and from 0 to 8 parts by weight of salicylic acid or its equivalent. The preferred compositions comprise from 45 to 55 parts by weight of methylene dianiline, 9 to 11 parts by weight of epoxy novolac having an epoxide equivalent weight of 175–182, 40 to 48 parts by weight of benzyl alcohol and about 6 parts by weight of salicylic acid.

To prepare the curing agent mixture of this invention, it is necessary only to combine the indicated components in any order or sequence, portionwise or all at once, and gently heat the mixture, avoiding such local over-heating as might burn, to achieve a desired degree of plasticity. The employed temperature may be chosen at the convenience of the chemist as he observes the mixture, but 70° C. has been found entirely satisfactory. If no consideration dictates using a higher temperature, the lowest temperature at which complete homogeneous mixing can be achieved is the preferred temperature. Viscosity can be reduced by adding a solvent, such as toluene, when solvent is acceptable in the product.

When complete, the curing agent mixture may be cooled and kept in storage, indefinitely, or it may be employed at once.

To cure a curable liquid polyepoxide characterized by having an average of more than one 1,2-epoxyalkyl group per molecule, for example, the diglycidyl ether of bisphenol A, it is necessary only to combine the curing agent of the instant invention with intimate mixing and stirring with the polyepoxide to be cured. Solvent may be employed to soften either or both components, or it may be omitted, as desired.

Cure takes place at room temperature very promptly, the initial gel phase developing in 30 minutes or less. The curing agent is employed in such amount as may prove, by simple range finding experiment, to give the best results, but typically, 60 parts of curing agent per 100 parts of polyepoxide, both by weight, have given good results.

A complete cure takes place at room temperature with moderate further extension of time, or cure can be accelerated, conventionally, by heating.

EXAMPLE 1

The following composition was prepared, all parts by weight:

| Component: | Parts |
|---|---|
| Methylene dianiline | 50 |
| Benzyl alcohol | 44 |
| Salicylic acid | 6 |
| Epoxy novolak (epoxide equivalent weight 175–182, functionality of 3.6) | 10 |

The components were intimately mixed and stirred together and held at 70° C. for one hour. The exact nature of the reactions that took place is not known, but the curing agent product was a homogeneous fluid mixture, of a Brookfield viscosity (number five spindle, 100 r.p.m.) of 950 centipoises at 25° C. and a color of 8–10 on the Gardner scale.

Sixty grams of the curing agent were intimately mixed and stirred into 100 grams of a curable liquid polyepoxide, predominantly the diglycidyl ether of bisphenol A, and the resulting mixture held at room temperature and observed. It hardened to the gel stage in 30 minutes.

The product was cured at room temperature for seven days and portions thereof were tested for weight gain in the following solvents for the time and temperatures indicated:

| | Percent | |
|---|---|---|
| Solvent | 3 months at 70° C. | 4 months at 20° C. |
| Distilled water | 1.2 | 1.4 |
| 10% HCl | 1.7 | 1.5 |
| 10% acetic acid | 1.8 | 1.7 |
| Benzene | 8.3 | 1.7 |
| Toluene | 3.2 | None |

Another sample of the above product was placed in boiling toluene. After 1 hour the weight gain was only 1%. In 4 hours the weight gain was 2.0% and in 15 hours the weight gain was only 3.8% thus showing the excellent resistance to solvent attack obtained when employing the curing agent of this invention.

We claim:

1. A homogeneous fluid curing agent for epoxy resins prepared by combining 45 to 55 parts by weight of methylene dianiline, 5 to 15 parts by weight of an epoxy novolac having an epoxy equivalent weight of 172 to 210, 25 to 48 parts by weight of benzyl alcohol and 0 to 8 parts by weight of salicylic acid at the lowest temperature necessary to achieve complete homogeneous mixing for about one hour.

References Cited
UNITED STATES PATENTS

| | | | |
|---|---|---|---|
| 2,897,179 | 7/1959 | Shechter et al. | 260—59 |
| 3,020,254 | 2/1962 | Less et al. | 260—59 |
| 3,526,607 | 9/1970 | Brown et al. | 260—47 EN |
| 3,563,907 | 2/1971 | Nadeau et al. | 252—182 |

OTHER REFERENCES

Tanaka, Y., Study of Epoxy Compounds, J. of Polymer Science, Part A, vol. 2, No. 8, August 1964, pp. 3405–30.

LEON D. ROSDOL, Primary Examiner

IRWIN GLUCK, Assistant Examiner

U.S. Cl. X.R.

260—2.5 EP, 47 EC, 47 EN, 47 EP, 59